Feb. 11, 1930.  G. C. CARHART  1,746,764
SYNCHRONIZING CLUTCH
Filed Aug. 7, 1923   3 Sheets-Sheet 1

George C. Carhart — INVENTOR.
BY Parsons & Bodell — ATTORNEYS.

Feb. 11, 1930.   G. C. CARHART   1,746,764
SYNCHRONIZING CLUTCH
Filed Aug. 7, 1923   3 Sheets-Sheet 3

George C. Carhart
INVENTOR.

BY
Parsons & Bridell
ATTORNEYS.

Patented Feb. 11, 1930

1,746,764

UNITED STATES PATENT OFFICE

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK

SYNCHRONIZING CLUTCH

Application filed August 7, 1923. Serial No. 656,276.

This invention has for its object a particularly simple, efficient and durable synchronizing clutch or a clutch by which the rotative movement of the parts connected by the clutch are synchronized, if rotating at different speeds, when one clutch member is being shifted into engagement with the other whereby shock and noise are eliminated and further has for its object the combination of a transmission gearing such as is used in motor vehicles and the synchronizing clutch for disconnecting the driving and driven parts of the clutch during gear shifting operations and again connecting them when the gear shifting operations are completed.

The invention consists in the novel features and in the combinations and the constructions hereinafter set forth and claimed.

In describing this invention, reference is had to the accompanying drawings in which like characters designate corresponding parts in all the views.

Figure 1:
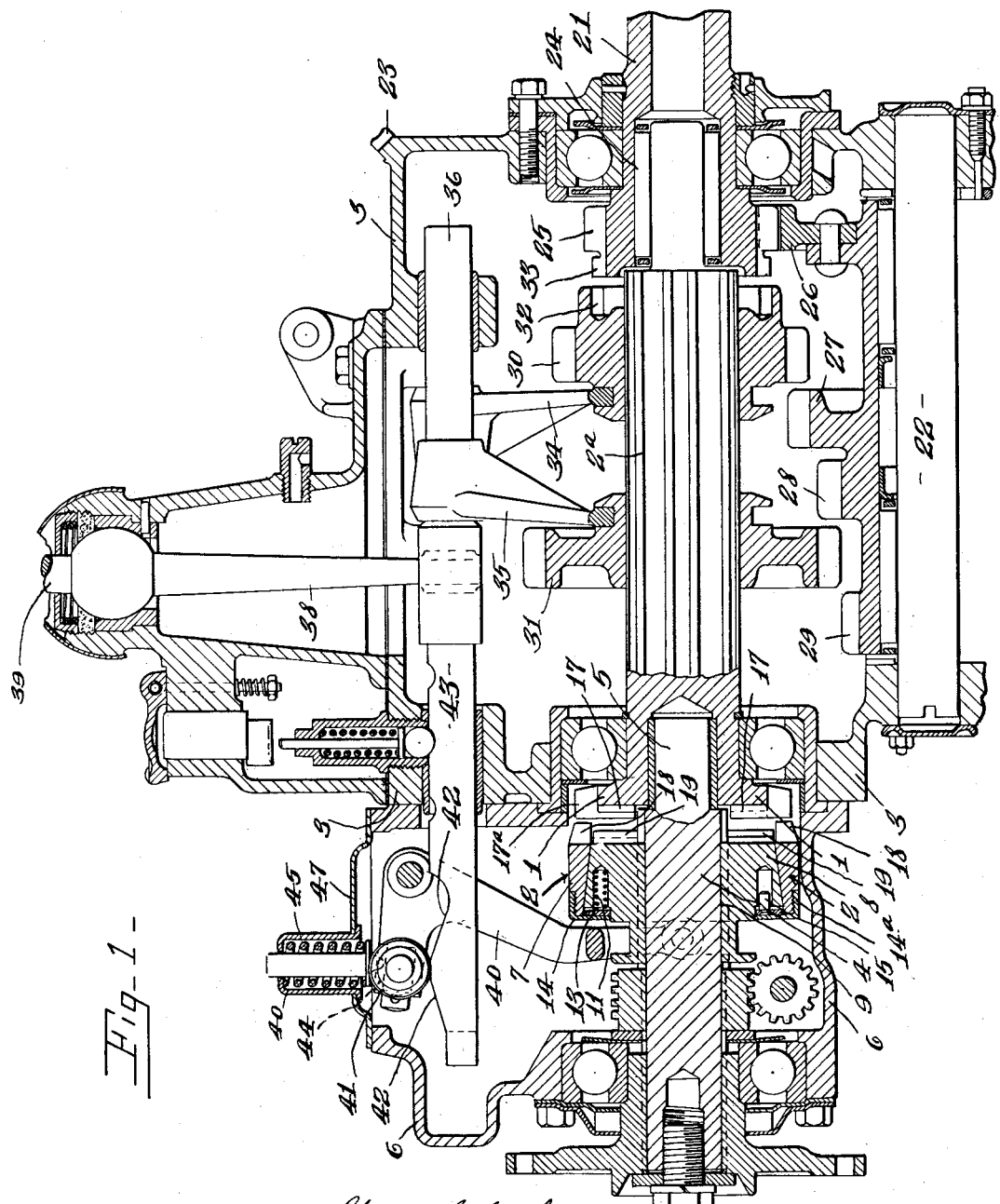
Figure 1 is a vertical sectional view of one form of this clutch, the same being shown as embodied in a transmission gearing, such as is used in motor vehicles, a fragmentary sectional view of the transmission gearing being shown.
Figure 2:
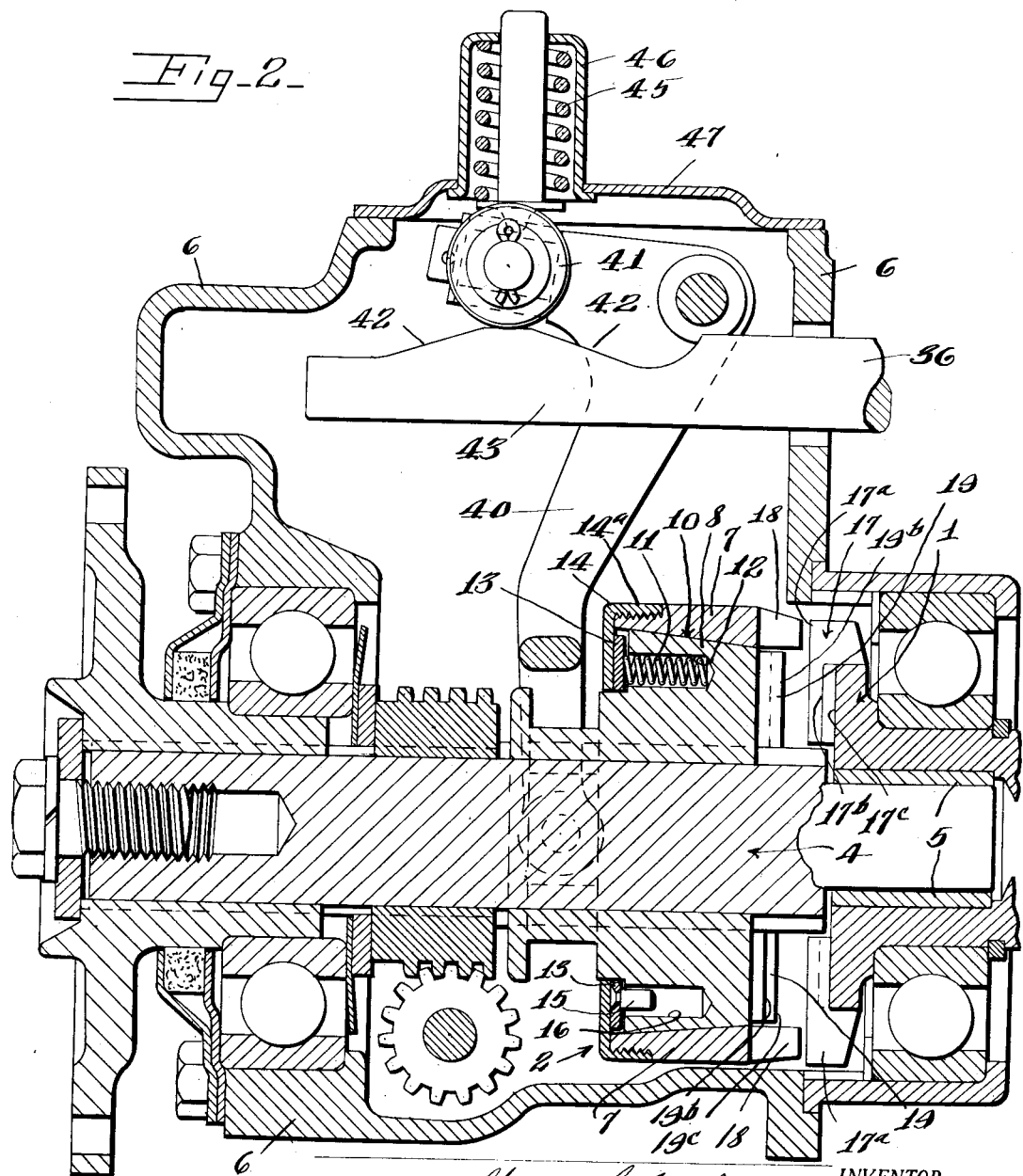
Figure 2 is an enlarged view of the clutch and contiguous parts.
Figure 3:
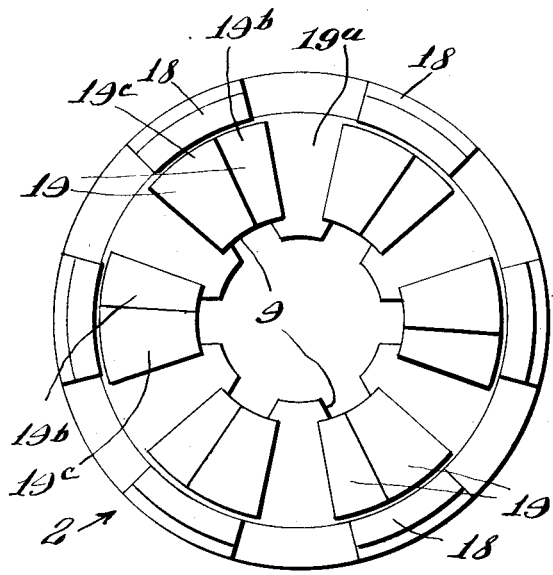
Figures 3 and 4 are opposing face views of the clutch members.
Figure 4:
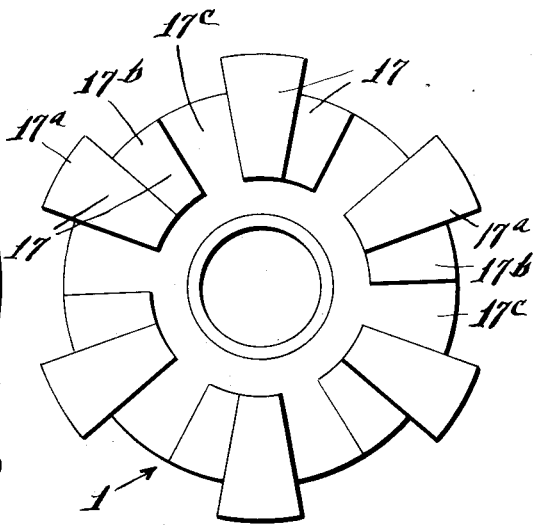
Figure 5:
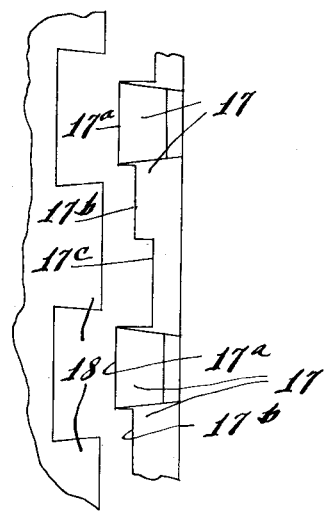
Figure 5 is a fragmentary side elevation of the clutch members showing in edge view the clutch teeth of the clutch members.
Figure 6:
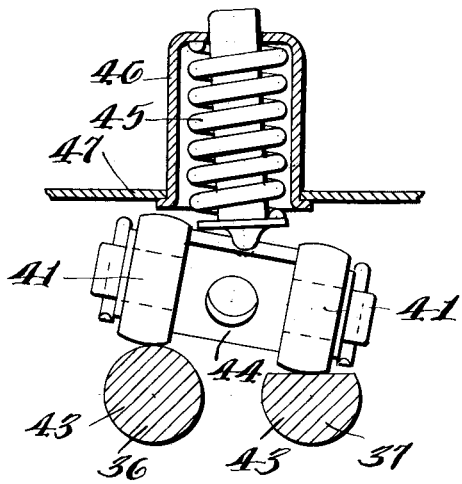
Figure 6 is a detail end view of the clutch shifting lever and contiguous parts.

This clutch comprises generally driving and driven members, having coacting clutch faces, one of such members being shiftable or such members having relative movement into and out of engagement with each other, and means for synchronizing the rotative movements of such members when being moved into engagement one with the other, whereby the clutch members engage without appreciable shock and noise. Preferably one of the members is composed of sections and the synchronizing action takes place between the sections, the sections being here illustrated as having coacting friction faces.

More specifically, the clutch comprises driving and driven members having coacting clutch faces, one member being shiftable relatively to the other to engage and disengage such clutch faces and one of the members comprising sections, which are frictionally engaged and which normally rotate as a unit, but which have relative rotative movement when the friction between such faces is overcome, portions of the clutch face of the sectional member being provided on both sections and the portion of the clutch face on one section being arranged to engage the face on the other member in advance of the portion of the clutch face on the other section whereby, when the clutch sections are shifted into engagement with each other, the section first to engage the other member can rotate with such other member relatively to the other section in case the power received by the first section is greater than the frictional resistance can transmit. In other words, the shock that would otherwise occur is transformed into or absorbed by sliding friction. The frictional resistance can be adjusted or made greater or less to conform to the conditions under which the clutch is to operate.

I have here shown my invention as embodied in a transmission gearing of the type used in automobiles and motor vehicles and the clutch is here shown as located between the transmission gearing and the propeller shaft, that is, it is embodied in a transmission gearing of the type in which the propeller shaft is disconnected from the gearing during gear shifting operations by shifting the clutch section connected to the propeller shaft out of engagement with the clutch section connected to the driven shaft of the transmission gearing. However, the clutch may be obviously located in various other situations.

1 and 2 designate the members of the clutch, the member 1 being that mounted upon the driven shaft 2ª of the transmission gearing and within the main case 3 of the gearing. The member 2 is shown as mounted upon a rear section 4 of the driven shaft 2ᵃ which is arranged in alinement with the driven shaft 2ᵃ, the shaft 4 being here shown as having a pilot bearing at 5 in the clutch section 1. This shaft 4 is preferably mounted in a housing 6 mounted on the outside of the main case 3 of the gearing in any suitable manner and is connected by a universal joint to the intermediate section of the propeller shaft. These clutch sections 1, 2 are provided with coacting preferably positively engaging or interlocking toothed or jaw clutch faces, and one of the members 1, 2 here shown, as the member 2, comprises sections having frictionally engaged clutch faces, and portions of the toothed face are provided on both sections. The portions of the teeth or jaws on the section, which is not keyed to the shaft 4, are longer than the portions on the section which is keyed to the shaft 4, so as to engage teeth or jaws of section 1 in advance of the portions of the teeth or jaws provided on the section of the member 2, which is keyed to the shaft 4.

As here illustrated, the member 2 comprises outer and inner, concentric sections 7, 8, the inner section being keyed or splined at 9 to the shaft 4, and these sections being provided with coacting frictionally engaged faces, usually conical faces as at 10, and means as springs 11 are provided tending to thrust the sections together and hold their frictional faces in engagement. As here illustrated, the springs 11 are arranged in recesses 12 in the section 8 and thrust against the bottoms of the recesses and against an abutment ring 13 rotatable with the section 8 and held in place by a cover or plate 14 suitably secured to outer section 7. As here shown, the plate 14 is provided with an annular flange 14ᵃ which threads on the outer section 7. The ring 13 is connected to the section 8 to rotate therewith in any suitable manner and, as here shown, is provided with lugs or shoulders 15 extending into recesses 16 similar to the recesses 12, the lugs 15 and recesses 16 alternating with the springs 11 and the recesses 12.

17 designates the jaws or teeth of the section 1, and 18 and 19 the portions of the jaws or teeth provided respectively on the outer section 7 and the inner section 8 of the clutch member 2, the teeth or jaws 18 being longer than the jaws 19, so as to engage the teeth or jaws 17 in advance of the teeth or jaws 19, when the clutch member 2 is being shifted into engagement with the clutch member 1.

As here illustrated, the teeth 17 of the member 1 are in step formation designated as 17ᵃ, 17ᵇ and 17ᶜ and the outer portions 17ᵃ extend beyond the outer or peripheral ends of the steps 17ᵇ and 17ᶜ in position to engage with the teeth 18 of the outer section 7 of the clutch member 2. The inner portions of the teeth 17ᵃ and the steps 17ᵇ and 17ᶜ engage with the teeth 19 of the inner section 8 of the clutch member 2 which are in formation complemental to the inner portions of the teeth 17ᵃ and the steps 17ᵇ and 17ᶜ. The steps of the teeth 19 are designated respectively 19ᵃ, 19ᵇ and 19ᶜ. The outer portions 17ᵃ of the teeth 17 are here shown as of less width than the space between the teeth 18 of the outer section 7 of the member 2 but the steps 19ᵃ, 19ᵇ and 19ᶜ of the section 8 of the member 2 fit with no appreciable back lash the inner portions of the teeth 17ᵃ and the steps 17ᵇ and 17ᶜ of the clutch member 1. Preferably the side or engaging faces of the teeth 18 and the outer portions 17ᵃ of the teeth 17 are under bevelled or in the nature of a dovetail, so that when the teeth 17, 18 engage or partially engage, the turning movement causes these bevelled or dovetailed faces to wedge thereto or draw the shiftable clutch section 2 toward the other clutch member 1, due to the engagement of the inclined or bevelled faces of the teeth 18 and portions 17ᵃ.

If the shafts on which the clutch sections are mounted are rotating at different speeds, when the outer clutch section 7 of the member 2 engages the outer portions of the teeth portion 17ᵃ of the member 1, such outer section 7 and member 1 will rotate at the same speed relatively to the clutch section 8 of the member 2 against the frictional resistance between the conical faces of the clutch sections 7, 8 until the speeds of the two shafts are substantially synchronized and, during such synchronization, the tooth portions 19ᵃ, 19ᵇ, 19ᶜ, will register with the tooth portions 17ᵃ, 17ᵇ and 17ᶜ and be moved into mesh therewith by the spring of the operating means to be presently described.

The transmission gearing, in addition to the driven shaft 2ᵃ comprises the driving shaft 21, the countershaft 22, gears mounted on the driving and driven shafts and on the countershaft, some of the gears being shiftable, and means for selecting and shifting the shiftable gears. The drive shaft 21 is suitably journalled in a wall of the main case 3 and extends to the outside thereof and is connected to the engine through a main clutch, in any well known manner. The housing 3 may also be supported on the housing of the main clutch in any well known manner, it having the usual flange 23, which is bolted to the main clutch housing. The driven shaft 2ᵃ has a pilot bearing at 24 in the inner end of the drive shaft 21. 25 is a gear mounted on the inner end of the shaft 21 and usually formed integral therewith and meshing with a gear 26 on the countershaft 22. 27, 28 and 29 are additional gears mounted on the countershaft and rotatable as a unit with the gear 26, these gears being usually formed integral with a hub common to all the gears on the countershaft. 30 and 31 are gears mounted on the driven shaft 2ᵃ to rotate therewith. The gears 30, 31 are usually shiftable axially, the gear 30 also having a clutch face 32 shiftable into and out of engagement with the clutch face 33 on the inner end of the drive shaft 21. The gear 29 meshes with an idler or intermediary not shown. The gears 25, 26 are usually always in mesh. Shifting of the gear 31 into mesh with the gear 28 produces low speed forward and shifting of this gear 31 into mesh with the idler which meshes with the gear 29 produces reverse rotation of the transmission shaft $2^a$; shifting of the gear 30 to the left into mesh with the gear 27 produces intermediate speed forward; and shifting of the gear 30 to the right to engage the clutch faces 32 and 33 produces high speed or direct drive.

The means here illustrated for shifting gears 30, 31 comprises forks or shifters 34, 35, which are shown as mounted upon shifter rods 36, 37 slidable endwise of the main case and a selecting and shifting lever 38 of any well known construction for coacting with the rods 36, 37. This lever extends upwardly and has a handle at its upper end but is here shown as broken away at 39.

In operation, assuming that this clutch is embodied in an automobile transmission gearing in position to disconnect during the gear shifting operation the driven shaft of the transmission gearing from the extension or section of the driven shaft, which is connected to the front end of the propeller shaft, the clutch member 2 is shifted by the operation of the gear shifting lever 38 out of engagement with the section 1 and after the gear shifting is completed or at the end of the gear shifting operation, or as soon as the gear teeth come into partial or full engagement, the clutch member 2 is shifted to engage the clutch member 1. While the gears are being shifted, the shaft 4 is being driven by the momentum of the automobile or vehicle and, hence, acts as a driver on the section 8. Therefore, when the longer clutch teeth or jaws 18 engage the teeth or jaws $17^a$ of the member 1, if the driving force received from the shaft 4 is too great to be received without shock by the member 1, slippage occurs between the sections 7 and 8 and during such slippage the different speeds of the shafts are synchronized by the action of the friction faces, causing the member 1 to readily pick up or drop down to the speed of the section 8 when the shorter teeth or jaws 19 engage the clutch teeth or jaws 17, so that a positive connection is effected between the shafts 4 and $2^a$ through the clutch members 1 and 2, and the clutch members 1 and 2 come into interlocking engagement with practically no appreciable shock.

When the clutch is embodied in other situations, as in the direct drive clutch of the transmission gearing between the driving and driven shafts of the transmission gearing, or in the main or engine clutch, or in any other situation, the operation is substantially the same.

The clutch member 2 may be operated in any suitable manner and, as here shown, it is operated by a shifting lever 40 having followers 41 coacting with cam surfaces 42 on extensions 43 of shifter rods 36, 37, one of which is selected and operated during each gear shifting operation. The followers 41 are usually rollers carried by a lever 44 mounted transversely on one arm of the lever 40 and are held against the cam surfaces 42 in any suitable manner as by a spring 45. This spring is preferably located in a cap 46 carried by a cover 47 of the housing 6, the spring pressing against the intermediate part of the lever 44, that is directly in line with or above the pivot thereof. The housing 6, as here shown, is applied to the regular transmission case and is attached on the outside thereof.

When both shifter rods 36, 37 are in neutral position, both rollers 41 are at the high points of the cam surfaces 42 and the clutch member 2 is out of engagement with the clutch member 1. When either rod 36, 37 is shifted from neutral to shift either of the gears 30, 31 into driving position, the roller 41 coacting with the cam of the rod, being shifted, will ride down one of the inclines of the cam and the spring 45 will tilt the lever 44 about the point of contact of the roller coacting with the other unshifted rod and thus actuate the lever 40 to shift the clutch member 2 into engagement with the clutch member 1. The spring 45 thus yieldingly engages the clutch members 1 and 2 and permits any delay that may occur in the complete engagement of the clutch members, due to the teeth not coming immediately into full mesh.

Upon the shifting of the shifter rod back to neutral, the clutch members are disengaged by the action of the cam surface 42 on the roller or follower 41 coacting with the rod, being shifted. The clutch member 2 is thus positively shifted out of engagement with the clutch member 1 and yieldingly moved into engagement with the clutch member 1.

The construction of the shifting mechanism, per se forms the subject matter of my pending application, Sr. No. 657,409 filed August 14, 1923.

What I claim is:

1. In a power transmitting device for motor vehicles, the combination with a two-part multiple-jaw clutch, of means embodied in said clutch for effecting substantial equalization of the rotative speeds of the two parts of the clutch preparatory to full reengagement thereof after having been disengaged, said means comprising a plurality of spaced lugs integral with one of the parts of said clutch and extending longitudinally beyond the faces of the jaws thereof, a member, of substantially cup-shape, rotatably mounted on the other part of said clutch and having a plurality of spaced lugs extending longitudinally beyond the faces of the jaws thereof, a friction member operatively engaging the member of cup-shape, and a resilient means for pressing said friction member against said member of cup-shape.

2. In a clutch, the combination of driving and driven members having coacting toothed clutch faces, one of such members being shiftable into and out of engagement with the other, and one of such members comprising inner and outer sections frictionally engaged with each other, and means tending to hold them in frictional engagement, each of the sections being formed with a portion of the toothed clutch face of such sectional member, and a portion of the clutch face of the other member having teeth and spaces between the teeth in the form of a dovetail, the teeth on such outer section being of less width than the spaces between the dovetail teeth on the other clutch member and being arranged to engage the teeth of the other member in advance of the portion of the clutch teeth on the inner section.

3. In a clutch, the combination of driving and driven members having coacting toothed clutch faces, one of such members being shiftable into and out of engagement with the other, and one of such members comprising inner and outer sections frictionally engaged with each other, and means tending to hold them in frictional engagement, each of the sections being formed with a portion of the toothed clutch face of such sectional member, and a portion of the clutch face of the other member having teeth and spaces between the teeth in the form of a dovetail, the teeth on such outer section being of less width than the spaces between the dovetail teeth on the other clutch member and being arranged to engage the teeth of such other member in advance of the portion of the clutch teeth on the inner section, and the portion of the teeth on the inner section being arranged to substantially fit the coacting teeth of the other member.

4. In a clutch, the combination of driving and driven members having coacting toothed clutch faces, one of such members being shiftable into and out of engagement with the other, and one of such members comprising inner and outer sections frictionally engaged with each other, and means tending to hold them in frictional engagement, each of the sections being formed with a portion of the toothed clutch face of such sectional member, and a portion of the clutch face of the other member having teeth and spaces between the teeth in the form of a dovetail, the teeth on such outer section being of less width than the spaces between the dovetail teeth on such other member and being arranged to engage the teeth of such other member in advance of the portion of the clutch teeth on the inner section, and the portion of teeth on the inner section being arranged to substantially fit the coacting teeth of the other member, and such teeth on the inner section and the coacting teeth on the other member being arranged in complemental step formation.

In testimony whereof, I have hereunto signed my name, at Syracuse, in the county of Onondaga, and State of New York, this 6th day of Aug., 1923.

GEORGE C. CARHART.